Patented May 6, 1952

2,595,266

UNITED STATES PATENT OFFICE 2,595,266

PRODUCTION OF ALPHA-NAPHTHOL BY CATALYTIC REDUCTION OF ALPHA-TETRALOL AND ALPHA-TETRALONE

Robert Johnson, Ingomar, Pa., assignor to Koppers Company, Inc., Pittsburgh, Pa., a corporation of Delaware No Drawing. Application January 9, 1948, Serial No. 1,490

4 Claims. (Cl. 260—621)

This invention relates to the manufacture of alpha-naphthol. More particularly, the invention relates to the catalytic dehydrogenation of $\alpha$-tetralol or a mixture of $\alpha$-tetralone and $\alpha$-tetralol to produce alpha-naphthol.

French patent, 693,596 of November 12, 1930, describes a process of producing alpha-naphthol by reacting $\alpha$-tetralone with sulphur by a reaction which sets free hydrogen sulphide ($H_2S$). In accordance with the present invention $\alpha$-tetralone or $\alpha$-tetralol or a mixture of these compounds may be directly dehydrogenated to produce alpha-naphthol.

In my copending applications, Serial No. 655,773, filed March 20, 1946, now U. S. Patent No. 2,454,804, issued November 30, 1948, and Serial No. 656,782, filed March 23, 1946, now U. S. Patent No. 2,462,103, issued February 22, 1949, processes are described for the manufacture of $\alpha$-tetralol and $\alpha$-tetralone respectively from tetralin. In each of these processes, both $\alpha$-tetralol and $\alpha$-tetralone are formed as intermediate products and the mixture is further refined to separate the products.

The manufacture of $\alpha$-tetralol

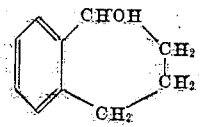

may be briefly described as follows: Tetralin is oxidized with air at a temperature of 80° to 120° C. in liquid phase and in the presence of copper carbonate as a catalyst. By this reaction tetralin peroxide is formed and this peroxide in the tetralin is then converted to a mixture of $\alpha$-tetralol and $\alpha$-tetralone, by heating the mixture to a temperature of 60° to 120° C. with an aqueous sodium hydroxide solution. The tetralin solution of $\alpha$-tetralol and $\alpha$-tetralone is practically insoluble in the caustic solution and may be separated by decantation or other suitable means. The mixture is then vacuum distilled to separate tetralin from the mixture of $\alpha$-tetralol and $\alpha$-tetralone. Thereafter the mixture consisting of alpha-tetralone and alpha-tetralol is hydrogenated with a copper oxide-chromium oxide catalyst to convert the tetralone to $\alpha$-tetralol and the $\alpha$-tetralol is separated from the hydrogenation reaction product by vacuum distillation or subatmospheric pressure distillation.

The manufacture of $\alpha$-tetralone

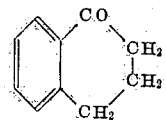

may be briefly described as follows: Tetralin is oxidized with air at 90° C. in the liquid phase and in the presence of suspended copper carbonate to give a concentrated solution of tetralin peroxide in tetralin. The peroxide solution resulting from oxidation is then treated with a hot aqueous solution of copper sulfate to convert the peroxide principally to alpha tetralone. As stated in the last patent listed above, one may, in general, employ for this treatment a copper salt of a mineral acid stable under the operating conditions which include temperatures between 25° and 100° C. and preferably between 60° and 90° C. Only a small amount of alpha tetralol is formed in decomposition of tetralin peroxide with this agent. The tetralin solution of $\alpha$-tetralone and $\alpha$-tetralol is practically insoluble in the aqueous solution and may be separated by suitable means as by decantation. The $\alpha$-tetralol and $\alpha$-tetralone mixture, after separation from tetralin by distillation, is vaporized and contacted with activated alumina to convert the $\alpha$-tetralol to dihydronaphthalene. The alpha-tetralone unaffected by this treatment may be readily separated from dihydronaphthalene by distillation.

Reference is made to the above-mentioned patent applications for detailed description of the above-mentioned processes.

I have discovered that both alpha-tetralol and alpha-tetralone may be simultaneously dehydrogenated to form alpha-naphthol. Accordingly the mixture of $\alpha$-tetralol and $\alpha$-tetralone obtained as products of oxidation may be used as such without the necessity for a separate separation step.

My work has further shown that the alpha-tetralone may be more effectively and economically dehydrogenated than alpha-tetralol. Therefore the process of oxidation of tetralin is carried out to produce the maximum amount of $\alpha$-tetralone and this oxidation product preferably becomes the raw material for producing the alpha-tetralol. In my work I have shown that I am able to make by the above-mentioned process mixtures of alpha-tetralone and alpha-tetralol in which the alpha-tetralone varies from 40% to 90% and the alpha-tetralol varies from 60% to 10%.

The primary object of the present invention is to provide a process of producing alpha-naphthol from a mixture of alpha-tetralol and alpha-tetralone.

Another object of the invention is to provide a cheap and efficient process for producing alpha-naphthol from tetralin.

A further object of the invention is to provide a process of producing alpha-naphthol by catalytic dehydrogenation of alpha-tetralol and/or alpha-tetralone.

With these and other objects in view the invention consists in the process of producing alpha-naphthol as hereinafter described and particularly defined in the claims.

The manufacture of alpha-tetralone in accordance with the preferred form of the process preferably consists in the dehydrogenation of a mixture of alpha-tetralone and alpha-tetralol in which the percentage of alpha-tetralone is greater than 50% of the mixture. Accordingly the process of making alpha-tetralone as outlined above is preferred for making the mixture of alpha-tetralone and alpha-tetralol. This mixture is pumped at a constant rate through an externally heated tube which is filled with catalyst generally in a granular form that is packed within the tube. A comparatively long tube with catalyst therein is used because it has been found that the space velocity, or time of reaction preferably should be greater than 0.5 second and good results have been obtained when using 2.0 seconds. The α-tetralone and α-tetralol are dehydrogenated in vapor phase wherein the temperature in the cracking zone may vary between 500° C. and 650° C. The time of reaction and the temperature depend upon the type of catalyst being used. If calcined granular limestone is used as a catalyst in combination with steam, a vapor mixture of α-tetralol and α-tetralone may be effectively dehydrogenated at a temperature of 650° C. to give a conversion of 30% to 35% alpha-naphthol per pass.

The limestone used was preferably a limestone obtained in western Pennsylvania which is calcined at a low temperature. Such a limestone contains from 50% to 60% of CaO and 1% to 2% of $Fe_2O_3$. A ferruginous limestone containing approximately 86% CaO and 14% $Fe_2O_3$ is a very effective dehydrogenation catalyst. A dolomite made up of 19% $Fe_2O_3$, 48% CaO, 33% MgO when calcined is an effective dehydrogenation catalyst which may be used with steam for the dehydrogenation of a vapor mixture of α-tetralol and α-tetralone.

The alpha-naphthol that is produced by the catalytic dehydrogenation reaction may be separated from the reaction mixture by caustic soda.

When using limestone as a catalyst and a temperature of 650° C. with steam and a mixture of tetralol and tetralone in the ratio of 10:1, a conversion to alpha-naphthol of 33.5% per pass with an ultimate yield value of 72% was obtained. The limestone catalyst does not become poisoned in this reaction and is therefore well adapted for the dehydrogenation reaction. The charging stock was a mixture of 51% α-tetralone and 47% α-tetralol. The products of the reaction in addition to alpha-naphthol were dihydronaphthalene 11.6% and a mixture of α-tetralol and α-tetralone of 53.5%. This intermediate reaction product consisted of approximately 33.5% α-tetralol and 65.5% α-tetralone.

The use of limestone as a catalyst is very desirable even when operating at temperatures of 600° to 650° C. because the activity of the catalyst is not interfered with by the deposition of carbon thereon. When using lime (i. e., calcined limestone) as a catalyst it is desirable to use a charging stock having a large amount of α-tetralone because α-tetralone is not dehydrogenated to form dihydronaphthalene as readily as is the α-tetralol.

A large number of runs have been made with many different types of catalyst using a mixture of α-tetralone and α-tetralol as charging stock. It has been found that an economic charging stock which may be readily dehydrogenated catalytically with limestone at a temperature of 600 to 650° C. consists of approximately 60% α-tetralone and 40% α-tetralol. When this mixture is dehydrogenated, a conversion of 30% to 35% per pass of alpha-naphthol is obtained and by recycling the unconverted α-tetralone-tetralol residue an ultimate yield of 80 to 85% may be obtained.

Preferably the catalytic dehydrogenation of the mixture of α-tetralone and α-tetralol is carried out at atmospheric pressure, although higher yields of alpha-naphthol may be obtained if the catalytic reaction is carried out in a vacuum or subatmospheric pressure.

The reaction mixture from the catalytic dehydrogenation of alpha-tetralol and tetralone is preferably refined by distilling the mixture. In the distillation alpha-naphthol is the first to come overhead and thereafter dihydronaphthalene may be recovered and then a mixture of α-tetralol and α-tetralone may be recovered as a separate distillate. This distillate can be mixed with the feed stock for recycling back to the process. In the reaction, part of the α-tetralone and α-tetralol mixture will be recycled from three to six times before it is converted to alpha-naphthol or intermediate products.

The preferred form of the invention having been thus described, what is claimed as new is:

1. In the production of alpha-naphthol, the method which comprises converting alpha-tetralone into products containing at least 80 percent of alpha-naphthol, based on the amount of alpha-tetralone converted, by contacting vapors of alpha-tetralone with calcined limestone at a temperature in the range between 500° and 650° C. for a time in the range between 0.5 to two seconds and in the presence of steam.

2. In the production of alpha-naphthol, the method which comprises converting a mixture of alpha-tetralone and alpha-tetralol into products containing at least 80 percent alpha-naphthol, based on the amount of said mixture converted, by contacting said mixture in the vapor state with a calcined limestone at a temperature in the range between 500° and 650° C. for a time in the range between 0.5 and two seconds and in the presence of steam.

3. The method of claim 2 in which the vaporous mixture contains predominantly alpha-tetralone.

4. A process of making alpha-naphthol from tetrahydronaphthalene which comprises oxidizing the tetrahydronaphthalene to produce tetrahydronaphthalene peroxide, decomposing said tetrahydronaphthalene peroxide in an aqueous solution containing a copper salt of a mineral acid stable under operating conditions including a temperature in the range of 60° to 90° C. to decomposition products comprising a mixture of alpha-tetralone and alpha-tetralol, alpha-tetralone being the major component of said mixture, separating the mixture from said decomposition products and contacting said mixture in the vapor phase with calcined limestone at a temperature in the range between 500° and 650° C. for a time in the range between 0.5 and two seconds and in the presence of steam.

ROBERT JOHNSON.

REFERENCES CITED

The following references are of record in the file of this patent:

UNITED STATES PATENTS

| Number | Name | Date |
|---|---|---|
| 2,242,325 | Read | May 20, 1941 |
| 2,291,585 | Bartlett et al. | July 28, 1942 |
| 2,418,879 | Haslam | Apr. 15, 1947 |
| 2,444,035 | Corson et al. | June 29, 1948 |

OTHER REFERENCES

Linstead et al., "Dehydrogenation. Part III. The Formation Of Naphthols...," J. Chem. Soc., 1940, pages 1134–1139 (6 pages).